United States Patent Office 3,042,659
Patented July 3, 1962

3,042,659
ACTIVATORS FOR THE POLYMERIZATION OF 2-PYRROLIDONE
Archie E. Follett, Decatur, Ala., assignor, by mesne assignments, to Monsanto Chemical Company, a corporation of Delaware
No Drawing. Filed Apr. 20, 1959, Ser. No. 807,270
15 Claims. (Cl. 260—78)

This invention relates to the manufacture of polymerization products of polymeric 2-pyrrolidone and more particularly relates to a new method of polymerizing 2-pyrrolidone, wherein new catalyst-activator systems are employed.

It is known that 2-pyrrolidone can be polymerized to produce a useful high molecular weight thermoplastic product that has become known as polypyrrolidone or nylon-4 and having in recurring relationship the following chemical structural unit:

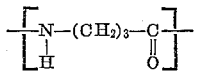

This polymeric product according to a known method can be produced by polymerizing 2-pyrrolidone in the presence of alkaline polymerization catalysts, such as potassium hydroxide, potassium pyrrolidone and the like. According to another known procedure the activity of these catalysts during polymerization reaction with reference to the rate of the polymerization, yield, and quality of the polymer can be enhanced by the addition thereto of various compounds that are classed as polymerization activators. Among the compounds heretofore proposed as polymerization activators are certain acyl compounds including: acyl pyrrolidone, such as N-acetyl pyrrolidone, adipyl dipyrrolidone, stearoyl pyrrolidone, acetyl morpholone, acetyl piperidone; organic peroxides, such as benzoyl peroxide; cyclic and non-cyclic anhydrides, such as maleic anhydride, phthalic anhydride and acetic anhydride; lactones, such as gamma-butyrolactone, beta-propiolactone, and glycollic lactide; alkyl esters of mono- and dicarboxylic acids, such as butyl stearate, ethyl acetate, propyl butyrate, propyl acetate, ethyl oxalate, as well as esters of polyhydric alcohols, e.g., ethylene glycol diacetate.

To produce polymers from 2-pyrrolidone that are capable of being formed into fibers, filaments, and the like of textile commercial quality, it is necessary that 2-pyrrolidone in a highly pure state be employed. Stated another way, it has been found that in order to prepare a polymer from 2-pyrrolidone suitable for use in spinning satisfactory fibers, filaments, etc., meeting today's commercial requirements, the impurities normally found in 2-pyrrolidone produced by known methods must be removed from the monomer or reduced substantially in amount. When impure 2-pyrrolidone is employed as the monomeric material, even in conjunction with the more preferred known catalysts and activators, the resulting polymer has a lower molecular weight than desired and the reaction proceeds at an undesirably slow rate. One way and what seems to be the preferred way of purifying impure 2-pyrrolidone is following conventional crystallization procedures whereby a purity of 99 percent or better can be obtained. While pure or substantially pure 2-pyrrolidone can be polymerized in the presence of an alkaline polymerization catalyst and known activators to a high molecular polymer suitable for filament and fiber production, it was found that the polymerization reaction unfortunately gives poor polymer yield, e.g., in the order of 70 percent polymer or lower. Accordingly, the reaction product contains a considerable proportion of monomeric component which must be removed therefrom. Additionally, the molecular weight of the resulting polymer varies considerably between different polymerizations; in other words, one cannot maintain suitable uniformity of molecular weight of the resulting polymers from one polymerization to the other. Obviously, these variations of molecular weight reflect undesirable discrepancies in the quality of filaments and fibers made therefrom. Hence, heretofore there has been a need in the art for catalyst-activator systems which overcome the above-discussed disadvantages relative to the polymerization of 2-pyrrolidone of high purity.

It is an object of the present invention to provide new catalyst-activator systems for the polymerization of 2-pyrrolidone. It is another object of the invention to provide new catalyst-activator systems for the polymerization of 2-pyrrolidone which result in the formation of a polymer having desirable and improved physical properties, such as good solubility, excellent color, and high molecular weight. It is still another object of the invention to provide a new process for the polymerization of 2-pyrrolidone employing new catalyst-activator systems, whereby improved yields of polymer of high molecular weight are obtained. It is a further object of the invention to provide a new process for the polymerization of relatively pure 2-pyrrolidone employing new catalyst-activator systems wherein improved uniformity and less variation in the molecular weights of the resulting polymers produced at different times are attained. It is yet a further object of the invention to provide a new polymerizable composition of matter. Other objects and advantages of the invention will be apparent from the detailed description thereof related hereinafter.

In general, the objects of the present invention are accomplished by polymerizing monomeric 2-pyrrolidone under polymerization conditions in the presence of a catalytic amount of an alkaline polymerization catalyst and a small amount of N-monocarbonyl pyrrolidone activator with certain organic acid amide compounds which augment the activation action and which in themselves are not activators. Stated another way, it has now been discovered that certain N-monocarbonyl pyrrolidones when used in conjunction with certain organic acid amide compounds are highly effective activators for the polymerization of 2-pyrrolidone. The method of the present invention for polymerizing 2-pyrrolidone comprises the steps of forming a mixture of monomeric 2-pyrrolidone, an alkaline polymerization catalyst, N-monocarbonyl pyrrolidone polymerization activator, and an organic acid amide compound in suitable quantities and then subjecting the resulting mixture to polymerizing conditions until polymerization is complete or has proceeded to the desired extent.

The polymerization is carried out in the presence of alkaline polymerization catalysts for monomeric 2-pyrrolidone with the catalysts normally employed being preferred. Among the catalysts for polymerizing 2-pyrrolidone which can be employed in the practice of the present invention are: alkali metals including sodium, potassium, and lithium and the corresponding salts of these metals, e.g., the carbonates, as well as hydroxides, hydrides, and oxides of the said metals; strongly basic organic metallic compounds, such as the lithium, potassium, and sodium alkyls, e.g., butyl lithium and the aryls of the alkali metals, e.g., sodium phenyl, salts of 2-pyrrolidone such as sodium, potassium, and lithium pyrrolidone; and the oxides, hydroxides, and hydrides of the alkaline earth metals, for example, calcium and barium hydrides. Mixed catalysts, of course, can be employed. The catalysis are used preferably in catalytic amounts.

As mentioned above, the class of activators which have been found suitable for use in the process of the present invention are the N-monocarbonyl pyrrolidones, and preferably are those having the following chemical structure:

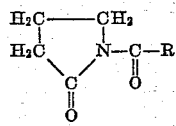

wherein R is hydrogen or an alkyl radical containing 1–8 carbon atoms. These pyrrolidones include: N-formyl pyrrolidone, N-acetyl pyrrolidone, N-propionyl pyrrolidone, N-butyryl pyrrolidone, N-valeryl pyrrolidone, etc. Of these activators just mentioned N-acetyl pyrrolidone is preferred.

The additives which favorably and advantageously augment the action of the polymerization activators are organic acid amide compounds including aliphatic amides, aromatic amides and N-substituted amides, these compounds having one acyl group of carboxylic acid origin. The additives have the following chemical structural formula:

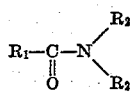

wherein $R_1$ is hydrogen, a phenyl radical, or an alkyl radical having from 1 to about 8 carbon atoms and $R_2$ is hydrogen or an alkyl radical having from 1 to about 8 carbon atoms. Specific examples of the organic acid amide compounds include formamide, acetamide, propionamide, butyramide, valeramide, γ-hydroxybutyramide, γ-methylbutyramide, N-ethylformamide, N-ethylacetamide, N,N-dimethylformamide, N,N-dimethylacetamide, and the like. Mixtures of additives also are within the scope of the invention. Of these additives, N,N-dimethylformamide and γ-hydroxybutyramide are most preferred. In order to obtain polymers of high molecular weight, it is preferred to use the acid amide additives in small amounts.

Preparation of polypyrrolidone with the novel composition of this invention can be carried out with various amounts of monomers, catalysts, activators and additives therefor, the amounts of each being properly coordinated as to produce the most effective polymerization. In general, the chemical equivalent amount of catalyst must exceed by at least a slight excess the number of chemical equivalents of activator. The alkaline polymerization catalysts can be employed in amounts ranging from about 0.002 to 0.25 chemical equivalent of catalyst based upon one mole of monomeric 2-pyrrolidone employed in the mixture. More preferred amounts of catalyst are about 0.005 to 0.25 chemical equivalent of catalyst based upon one mole of monomeric 2-pyrrolidone. Moreover, the N-monocarbonyl pyrrolidone activators can be employed in amounts ranging from about 0.0001 to 0.075 chemical equivalent of activator based upon one mole of monomeric 2-pyrrolidone employed in the mixture. More preferred amounts of activator are about 0.001 to 0.075 chemical equivalent of activator based upon one mole of monomeric 2-pyrrolidone. Additionally, the acid amide additives can be employed in amounts ranging from about 0.00005 to 0.075 chemical equivalent of the additive based upon one mole of monomeric 2-pyrrolidone employed in the mixture. More preferred amounts of additive are about 0.0005 to 0.075 chemical equivalent of the additive based upon one mole of monomeric 2-pyrrolidone. Although the preferred amounts of the components in the polymerization composition are given, it is to be understood that these are not intended to be limitative since it may be possible to effect polymerization also outside the aforesaid ranges.

For best results the process defined above requires, as the polymerizable monomer, a highly purified 2-pyrrolidone. In order to have the required purity, it may be necessary first that the commercially available 2-pyrrolidone be subjected to a purification procedure. In the practice of the present invention, the calculated amounts of 2-pyrrolidone, alkaline catalyst, activator, and additive are charged to a reaction vessel. The polymerization is carried out in general at temperatures within a range of −70° C. to 100° C. In the preferred practice of the invention, however, the reaction is conducted at a temperature in the range of 20° C. to 70° C. where most favorable polymerization is attained. The reaction time will vary with the temperature, as well as with the nature of and the relative amounts of the materials charged to the reaction vessel and is limited only by practical considerations such as the type of polymer desired. However, it will be appreciated readily that the reaction should be continued to completion or at least until a useful polymer is obtained. Generally, in carrying out the reaction the materials comprising the reaction mixture are subjected to these polymerization temperatures at atmospheric pressure in an inert atmosphere. However, the reaction may be carried out at pressures above or below atmospheric.

The reaction is performed preferably in a moisture-free atmosphere since the presence of water to the extent of more than several tenths mol percent based upon the weight of 2-pyrrolidone is detrimental to the polymerization reaction in that water adversely affects and inhibits polymerization. Therefore, for this reason care is taken normally in the practice of the invention not to exceed such concentration of water.

In view of the fact that many of the catalysts mentioned above inherently bring about the formation of water during the polymerization reaction, it is necessary to remove such water of reaction from the reaction medium as the water is formed. This removal of water can be accomplished easily by a simple vacuum distillation or the like. Therefore, when employing a catalyst that gives rise to the formation of water, such as sodium hydroxide, the monomeric 2-pyrrolidone and the catalyst are charged to the reaction vessel; and thereafter, these materials are reacted therein and subjected to vacuum distillation with mechanical stirring in order to remove the water so-formed. Although mechanical stirring is not absolutely necessary, it greatly aids in removal of the water. When the water so-formed is removed substantially completely, the activator and acid amide additive are added then to the reaction mixture and the reaction continued. When a catalyst that does not give rise to the formation of water such as an alkali hydride is employed, all of the ingredients can be added to the polymerization vessel simultaneously after which the reaction is carried to completion. However, when a catalyst such as an alkali hydride that brings about the formation of a gas is used, it is preferred to add the catalyst together with the monomer in the reaction vessel and then to provide means for removing the gas thus generated prior to the addition of the activator and additive to the reaction mass. This procedure minimizes the danger of explosive results where a combustible gas such as hydrogen is evolved. Hence, an advantage of the use of alkali hydrides, for example, over the water-forming catalysts such as sodium hydroxide is the elimination of the distillation step necessary for removal of the water of reaction.

In order not to obtain polymer having an undesirable color, it preferred to carry out the polymerization with the exclusion of molecular oxygen, as well as moisture. To do this it is possible to work in evacuated vessels or to drive out the oxygen by means of inert gases, as for example nitrogen.

The instant method for polymerizing 2-pyrrolidone can be carried out by either solution, emulsion, suspension or bulk polymerization techniques, the last procedure being preferred. The polymerizations may be accomplished by either batch, semi-continuous, or continuous methods. When solution polymerization is employed, the monomeric pyrrolidone is dissolved in a solvent such as 1,4-dioxane. The desired catalyst, activator, and acid amide are added to the solution and the polymerization is carried out under suitable polymerization conditions outlined above. Well-known solution polymerization apparatus is satisfactory in general for carrying out the methods employed in the practice of this inveniton. When applying emulsion or suspension polymerization procedures to the preparation of polypyrrolidone with the activators and augmenting additive therefor of this invention, the monomer containing the catalyst is dispersed in a known solvent therefor, such as petroleum ether containing an emulsifying agent. Subsequently, the desired activator, together with the additive therefor, is added to the dispersion; and the reaction mixture is subjected to polymerization conditions as previously mentioned. A suitable coagulant then is added to the polymerized mixture in order to precipitate the resultant polymer. For example, a suitable emulsifying agent which may be employed is sodium lauryl sulfate and a suitable coagulant is phosphoric acid.

The process of this invention is applicable generally to the polymerization of 2-pyrrolidone to form a long chain polymeric carbonamide which has recurring amide groups separated by a trimethylene radical as an integral part of the main polymer chain and which is capable of being formed into filaments in which the structural elements are oriented in the direction of the filament axis. It should be understood that 2-pyrrolidone can be co-polymerized with other substances polymerizable therewith whereby advantageous results can be obtained. For example, other monomeric cyclic amides such as the lactams of amino-carboxylic acid having at least five aliphatic carbon atoms between the amine and carboxyl groups, e.g., ε-caprolactam, can be polymerized in minor amounts with 2-pyrrolidone.

By proper selection of catalyst and conditions the percentages of conversion of 2-pyrrolidone to polymer prepared in accordance with this invention lie as a rule in the range higher than the range heretofore obtainable by employment of a N-substituted pyrrolidone activator alone. Since the polymerization of 2-pyrrolidone is not carried to 100 percent conversion of the monomers, the resulting polymer should be purified. To accomplish this it is usually desirable to wash the polymer with a solvent medium for the monomeric pyrrolidone, which is a non-solvent for the polymer; or if considered feasible, unreacted monomers can be distilled. It will be appreciated that likewise other conventional purification procedures can be used.

The products of this invention are characterized by a high softening temperature and their suitability for extrusion into filaments that can be cold drawn to a highly tenacious condition. Polypyrrolidone prepared in the presence of the activators and organic acid amides of this invention has a melting point in the range of 260° C. and is soluble in formic acid, formic acid diluted slightly with water, and other substances. The polymeric products of this invention have specific viscosities in the range of about 0.50 to 4.10, which represent in general fiber- and filament-forming polymers. It is to be understood, of course, that non-fiber-forming polymers may be produced which have a specific viscosity greater or less than 0.50 to 4.10, such polyamides being useful, for example, in the manufacturing of coating compositions, lacquers, molding compositions, and the like.

Specific viscosity, as employed herein, is represented by the formula:

$$N_{sp.} = N_{rel.} - 1$$

where $$N_{rel.} = \frac{\text{Time of flow of the polymer solution in seconds}}{\text{Time of flow of the solvent in seconds}}$$

Viscosity determinations are made by allowing said solutions and solvent to flow by gravity at 25° C. through a capillary viscosity tube. In all determinations of polyamide solution viscosities, a polymer solution containing 0.5 percent by weight of the polymer dissolved in a solvent mixture containing 95 percent formic acid and 5 percent water by weight was employed.

Various methods are known for spinning fibers from the polypyrrolidone prepared with the activators of this invention. These methods include the melt spinning, dry spinning, and wet spinning methods. Where the wet spinning method is employed, the polymer is dissolved in a suitable solvent and subsequently spun from the solution into a coagulating bath. In the dry spinning method the polymer is dissolved in a volatile solvent and extruded into a heated atmosphere in order to remove the solvent. The melt spinning method involves melting the polymer and extruding the molten polymer under pressure through orifices in a spinneret in a gas that solidifies the polymer stream by cooling.

Shaped articles which have a modified appearance or modified properties may be produced from the polypyrrolidone prepared in accordance with the present invention by use of various reagents to accomplish the desired effect. Such agents include plasticizers, pigments, dyes, antistatic agents, fire-retarding agents and the like. It should be understood that the polymer can be shaped into a variety of useful articles, such as films, rods, bristles, etc.

The following specific examples are intended to illustrate the invention more fully but are not intended to limit the scope thereof, for it is possible to effect many modifications therein. In the examples, all parts and percentages are by weight unless otherwise indicated.

*Example I*

This example illustrates carrying out polymerization of 2-pyrrolidone with neither the addition of the N-monocarbonyl pyrrolidone polymerization activator nor the organic acid amide additive of the present invention.

To a 25 gram sample of 2-pyrrolidone that had been purified by three recrystallizations and containing 0.08 percent moisture by weight in a glass closable reaction vessel, there was added under a nitrogen gas atmosphere 0.25 gram of sodium hydride catalyst. When the evolution of hydrogen gas was completed, the reaction vessel containing the resulting mixture was stoppered to exclude atmospheric moisture therefrom and allowed to stand for 24 hours at 35° C. The polymer so-produced was isolated and purified. The yield of recovered polymer was only 5 percent with the polymer having a viscosity of only 0.41.

*Example II*

This example illustrates carrying out polymerization of 2-pyrrolidone with the addition of a N-monocarbonyl pyrrolidone polymerization activator but without the addition of an organic acid amide additive.

To a 25 gram sample of 2-pyrrolidone that had been purified by three recrystallizations and containing 0.08 percent moisture by weight in a closable reaction vessel, there was added under a nitrogen gas atmosphere 0.25 gram of sodium hydride catalyst. When the evolution of hydrogen gas was completed, 0.23 ml. (2.2 millimoles or milliequivalents) of N-acetyl pyrrolidone was added to the reaction mixture. The reaction vessel containing the resulting mixture was stoppered to exclude atmospheric moisture therefrom and allowed to stand for 24 hours at 35° C. The polymer thus-produced was recovered by breaking up the formed cake, comminuting the cake into powder, and washing the powder throughly first with water and then with acetone. The polymer powder was then dried to a constant weight. From the amount of polymer recovered, it was calculated that a yield of 53 percent was obtained. The polymer had a specific viscosity of 1.78.

*Example III*

To a 25 gram sample of 2-pyrrolidone that had been purified by three recrystallizations and containing 0.08 percent moisture by weight in a closable reaction vessel, there was added under a nitrogen gas atmosphere 0.25 gram of sodium hydride catalyst. When the evolution of hydrogen gas was completed, 0.23 ml. (2.2 millimoles or milliequivalents) of N-acetyl pyrrolidone and 0.085 ml. (1.1 millimoles or milliequivalents) of N,N-dimethylformamide were added to the reaction mixture. The reaction vessel containing the resulting mixture was stoppered to seal it against atmospheric moisture and allowed to stand for 24 hours at 35° C. The polymer so produced was purified as described above in Example II. The percent conversion of monomer to polymer, or in other words percent yield, was found to be 71 percent. The polymer had a specific viscosity of 1.68. This polymer was formed into textile filaments by the wet spinning process which included bringing the polymer into solution with formic acid and extruding the resulting solution under pressure through orifices in a spinneret and into a suitable coagulating bath. The filaments were cold drawable and could be converted into textile articles having excellent physical properties.

*Example IV*

Purified 2-pyrrolidone was polymerized with a sodium hydride catalyst and 2.2 millimoles of N-acetyl pyrrolidone as above described in Example II for additional five times. The percentages of conversion of monomeric 2-pyrrolidone to polymer and the specific viscosities of the resulting polymers were measured and compared. It was found that the average percent conversion to polymer of this series of polymerizations was 55 percent and the average specific viscosity was 2.43. It was observed that the standard deviation of specific viscosities between the individual polymerizations was 0.61.

Purified 2-pyrrolidone was polymerized in the manner described in Example III in the presence of sodium hydried catalyst, 2.2 millimoles of N-acetyl pyrrolidone, and 1.1 millimoles of N,N-dimethylformamide for an additional five times. It was found that the average percent conversion was 66 and the average specific viscosity was 1.52. The standard deviation between the individual polymerizations with respect to specific viscosity was only 0.20. Thus, it is seen that N,N-dimethylformamide increased markedly the reproducibility of the specific viscosity in the bulk polymerization of 2-pyrrolidone.

Likewise, when other N-substituted pyrrolidones included within the above-described class are used together with the organic and amide compounds in accordance with the present invention, similar excellent results in regard to yields and uniformity of specific viscosities between different polymerizations are obtained.

From the above description of the invention, it is obvious that there are many advantages associated with the present invention over the prior art. For example, improved yields are obtained in the polymerization of 2-pyrrolidone where the organic acid amide compounds are used together with the organic carbonyl halide polymerization activators. Another distinct advantage is that where the organic halide activators and a suitable augmenting amide additive are used, notable uniformity of specific viscosities between the polymers produced in various polymerizations is obtained. In addition, the use of the combination of activator and additive of this invention decreases the amount of time necessary to polymerize 2-pyrrolidone. Furthermore, the new activator compounds of this invention are readily available and comparatively inexpensive and the polymerization reaction can be accomplished without substantial changes in existing equipment used in the polymerization of 2-pyrrolidone and the like. Hence, according to this invention it is possible to convert 2-pyrrolidone into technically valuable polymers in an efficient maner. Numerous other advantages will be apparent.

As many apparently widely different embodiments of this invention may be made without departing from the spirit and scope thereof, it is to be understood that the invention is not to be limited to the specific embodiments thereof except as defined in the appended claims.

What is claimed is:

1. A process for polymerizing 2-pyrrolidone which comprises the steps of forming under essentially anhydrous conditions a mixture containing monomeric 2-pyrrolidone, a catalytic amount of an alkaline polymerization catalyst, and a few percent based on the weight of the mixture of a N-monocarbonyl pyrrolidone polymerization activator, with a slight excess of catalyst over activator being present in said mixture and a few percent based on the weight of said mixture of an open chain organic acid amide having the following chemical formula:

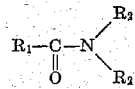

wherein $R_1$ is selected from the group consisting of hydrogen, a phenyl radical, and an alkyl radical having from 1 to about 8 carbon atoms and $R_2$ is selected from the group consisting of hydrogen and an alkyl radical having from 1 to about 8 carbon atoms and subjecting said mixture to a temperature in the range of −70° C. to 100° C.

2. A process for polymerizing 2-pyrrolidone which comprises the steps of forming under essentially anhydrous conditions a mixture containing monomeric 2-pyrrolidone, a catalytic amount of an alkaline polymerization catalyst selected from the group consisting of alkali metals; carbonates and pyrrolidone salts of alkali metals; alkali metal alkyls and aryls; hydrides, hydroxides, and oxides of alkali metals and alkaline earth metals; a few percent based on the weight of said mixture of N-monocarbonyl pyrrolidone polymerization activator having the formula:

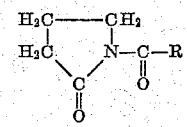

wherein R is a radical selected from the group consisting of hydrogen and an alkyl group containing 1–8 carbon atoms, with a slight excess of catalyst over activator being present in said mixture and a few percent based on the weight of said mixture of an open chain organic acid amide compound having the following chemical formula:

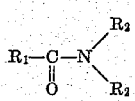

wherein $R_1$ is selected from the group consisting of hydrogen, a phenyl radical, and an alkyl radical having from 1 to about 8 carbon atoms and $R_2$ is selected from the group consisting of hydrogen and an alkyl radical having from 1 to about 8 carbon atoms and subjecting said mixture to a temperature in the range of −70° C. to 100° C.

3. The process as defined in claim 2 wherein the catalyst is sodium hydride.

4. The process as defined in claim 2 wherein the catalyst is sodium hydroxide.

5. The process as defined in claim 2 wherein the catalyst is potassium hydroxide.

6. The process as defined in claim 4 wherein the water of reaction is substantially completely removed before the addition of the polymerization activator and said amide additive.

7. The process as defined in claim 5 wherein the water of reaction is substantially completely removed before the addition of the polymerization activator and said amide additive.

8. The process as defined in claim 2 wherein the N-monocarbonyl pyrrolidone is N-acetyl pyrrolidone.

9. The process as defined in claim 2 wherein the open chain organic acid amide additive is N,N-dimethylformamide.

10. The process as defined in claim 2 wherein the open chain organic acid amide is N,N-dimethylacetamide.

11. A process for polymerizing 2-pyrrolidone which comprises the steps of forming under essentially anhydrous conditions a mixture containing monomeric 2-pyrrolidone, an alkaline polymerization catalyst selected from the group consisting of alkali metals; carbonates and pyrrolidone salts of alkali metals; alkali metal alkyls and aryls; hydrides, hydroxides, and oxides of alkali metals and alkaline earth metals; said catalyst being employed in an amount ranging from about 0.002 to 0.25 chemical equivalent of catalyst said chemical equivalents being based upon the gram molecular weight of the catalyst divided by the valence of the metal in said catalyst based upon one mole of monomeric 2-pyrrolidone, N-monocarbonyl pyrrolidone having the formula:

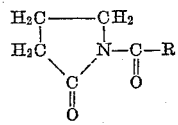

wherein R is a radical selected from the group consisting of hydrogen and an alkyl group containing 1–8 carbon atoms, said pyrrolidone activator being employed in an amount ranging from about 0.0001 to 0.075 chemical equivalent said chemical equivalents being based upon the gram molecular weight of the carbonyl divided by the number of carbonyl groups on the side chain of activator based upon one mole of monomeric 2-pyrrolidone, with a slight excess of catalyst over activator being present in said mixture and an open chain organic acid amide additive having the chemical formula:

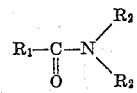

wherein $R_1$ is selected from the group consisting of hydrogen, a phenyl radical, and an alkyl radical having from 1 to about 8 carbon atoms and $R_2$ is selected from the group consisting of hydrogen and an alkyl radical having from 1 to about 8 carbon atoms, said amide additive being employed in an amount ranging from about 0.00005 to 0.075 chemical equivalent of additive said chemical equivalent being based upon the gram molecular weight of the amide additive divided by the number of amide groups in said additive based upon one mole of monomeric 2-pyrrolidone and subjecting said mixture to a temperature in the range of 20° C. to 70° C.

12. The process as defined in claim 11 wherein the polymerization catalyst is sodium hydride.

13. The process as defined in claim 12 wherein the N-monocarbonyl pyrrolidone polymerization activator is N-acetyl pyrrolidone.

14. The process as defined in claim 13 wherein the open chain organic acid amide additive is N,N-dimethylformamide.

15. The process as defined in claim 13 wherein the open chain organic acid amide additive is N,N-dimethylacetamide.

References Cited in the file of this patent

UNITED STATES PATENTS 2,739,959     Ney et al. _____ Mar. 27, 1956